United States Patent [19]

Hicks, Jr.

[11] Patent Number: 4,759,011
[45] Date of Patent: Jul. 19, 1988

[54] INTRANETWORK AND INTERNETWORK OPTICAL COMMUNICATIONS SYSTEM AND METHOD

[75] Inventor: John W. Hicks, Jr., Northboro, Mass.

[73] Assignee: Polaroid Corporation, Cambridge, Mass.

[21] Appl. No.: 835,515

[22] Filed: Mar. 3, 1986

[51] Int. Cl.$^4$ .............................................. H04B 9/00
[52] U.S. Cl. ...................................... 370/3; 370/124; 455/607
[58] Field of Search ......................... 370/3, 69.1, 124; 455/606, 607, 612, 617

[56] References Cited

U.S. PATENT DOCUMENTS

| | | | |
|---|---|---|---|
| 3,435,230 | 3/1969 | Courtney-Pratt et al. | 250/199 |
| 3,604,936 | 9/1971 | Kompfner | 250/199 |
| 4,089,584 | 5/1978 | Polczynski | 350/96.16 |
| 4,234,971 | 11/1980 | Lutes, Jr. | 455/619 |
| 4,317,614 | 3/1982 | Palmer | 350/96.16 |
| 4,330,869 | 5/1982 | Robieux | 455/607 |
| 4,592,043 | 5/1986 | Williams | 370/3 |
| 4,616,898 | 10/1986 | Hicks | 455/612 |
| 4,675,866 | 6/1987 | Takumi et al. | 370/124 |

*Primary Examiner*—Robert L. Griffin
*Assistant Examiner*—Leslie Van Beek
*Attorney, Agent, or Firm*—Francis J. Caufield

[57] ABSTRACT

An optical communication system suitable for wide area communications includes a plurality of local networks each having a communications bus and a plurality of terminal devices coupled to the respective local network communications bus for intranetwork communications with other terminal devices within the local network or internetwork communications with terminal devices in other local networks. Each terminal device includes a channel selecting device for selecting one of a plurality of frequency distinct communication channels. Each local network is assigned a common set of communication channels for communications within the local network and also assigned a unique subset of communication channels for internetwork communications. Each local network is coupled to every other local network through a frequency selective coupling means that passes only information signals at frequencies corresponding to the unique subset of communication channels for that local network.

24 Claims, 10 Drawing Sheets

INTRANETWORK AND INTERNETWORK OPTICAL COMMUNICATIONS SYSTEM AND METHOD

BACKGROUND OF THE INVENTION

The present invention relates to communications systems. More particularly, it concerns optical communications systems for efficiently transferring various types of information including voice, video, digital and analog data.

Various communication system arrangements have been developed for effecting information exchange between distributed terminal devices. In the present telecommunications system, each user is assigned a unique address and is connected to a switching node which, in turn, is connected to other users and to other switching nodes. In order to establish a communications path between any two users in the system, one or more switching nodes must be configured to establish a pathway between an originating user and the destination user. In the electrical domain, switching devices and controllers are readily available for effecting signal routing between originating and destination points in the system. While a communications path can be conveniently established in a switched system, the bandwidth of the system is limited to the bandwidth of the particular signal carrier and the switches used to convey the information.

With the advent of communications at optical frequencies, information carrying capabilities far in excess of present telecommunications systems have become available. While an optical communications system can be designed to provide a switching arrangement analogous to the existing telecommunications network, the present inability of existing devices to effect switching at optical frequencies requires the optical information to be converted to the electrical domain for switching and then back to the optical domain for transmission. The present inability to effect switching in the optical domain greatly limits the effective utilization of optical communications technology, particularly in wide area networks.

SUMMARY OF THE INVENTION

In accordance with the above, the present invention provides for an optical communications system well suited for either local or wide area applications for transferring large amounts of information at optical frequencies without the need for any type of switching or signal path routing control. An optical communications system in accordance with the present invention includes at least first and second local optical networks, either of the closed or open bus type, with each local network having a plurality of terminal devices connected to their respective network bus. An optical power source is connected to each local network and functions to supply fixed frequency optical energy to the network at a plurality of predetermined channel frequencies. Each terminal device is selectively tunable over the entire range of frequency distinct communication channels to effect communications. The terminal devices within respective networks are assigned to a common subset of intranetwork communication frequencies for communications within the local network and to a unique subset of communication channels for internetwork communications. Each local network is connected to every other local network through frequency selective coupling devices so that each network shares a subset of internetwork communication frequencies with every other network. In order for one terminal device within a local network to communicate with another terminal device within another local network, the originating terminal device acquires an available communication channel of the subset of communications channels for the destination network and then transmits a call request signal on an internetwork manager channel for the destination network. Terminal devices within all other networks monitor their manager channels for their own address, and, in response to recognition of their address, tune to the channel acquired by the originating terminal device to effect communications.

The optical power sources for each local network can provide each predetermined channel frequency with an encoded "channel number" identity word so that each terminal device can tune from one channel to another by decoding the "channel number" for a particular channel, determining the difference in channel numbers between the present channel and a desired channel, and tuning in the appropriate direction.

Automatic frequency control for a particular channel is achieved by sensing the carrier strength of the two channels immediately adjacent an acquired channel and optimizing acquisition by maintaining the carrier strength of the two immediately adjacent channels substantially equal.

A principal objective of the present invention is, therefore, the provision of an improved optical communications system in which data can be transferred in an efficient manner without constraints associated with traditional switching systems. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
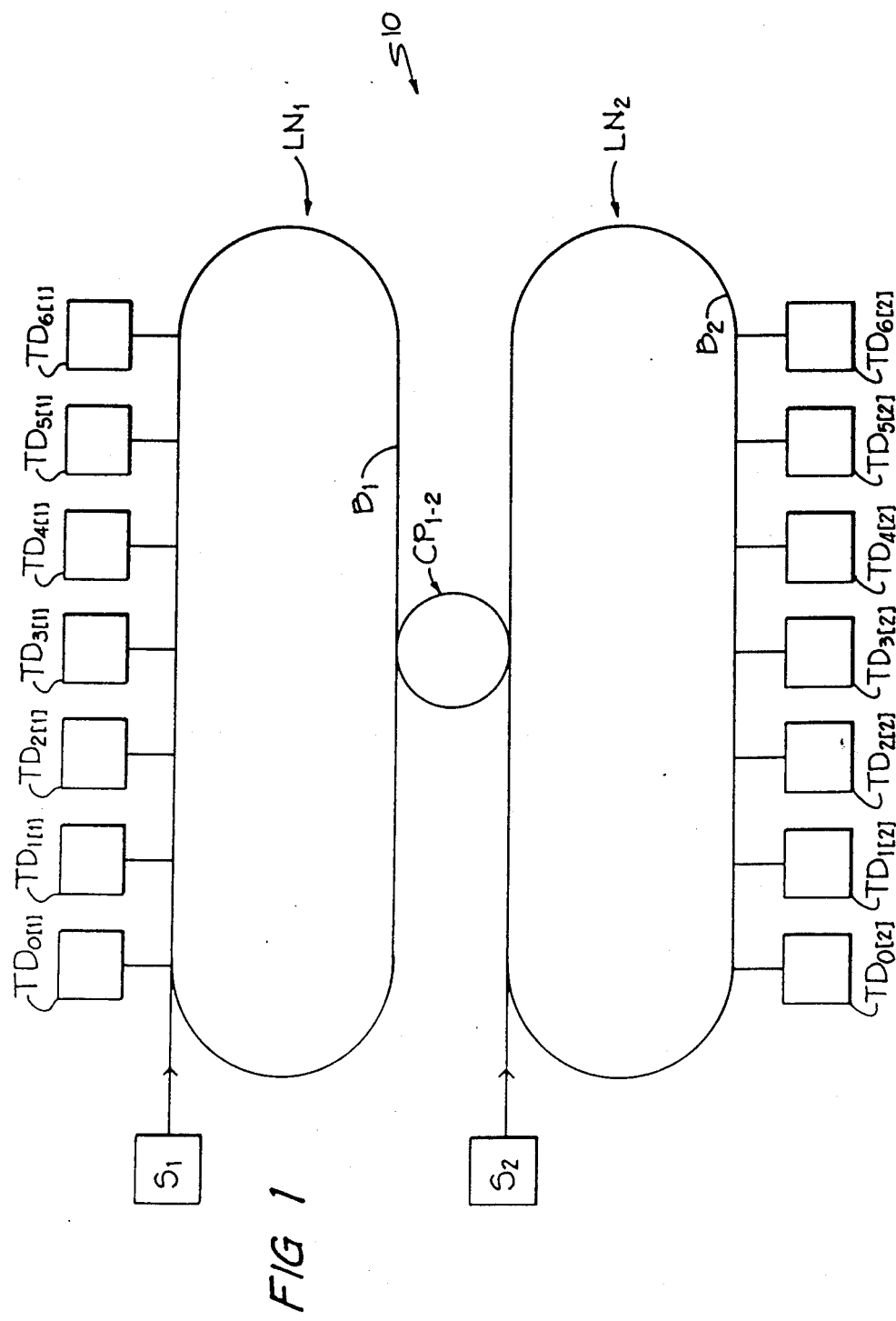
FIG. 1 is a schematic block diagram of an optical communications system in accordance with the present invention.

An exemplary optical communications system in accordance with the present invention is illustrated in FIG. 1 and designated generally therein by the reference character 10. As shown, the optical communications system 10 includes a first local network $LN_1$ and a second local network $LN_2$ coupled together through an internetwork coupling path $CP_{1-2}$. Each local network, as exemplified by the local network $LN_1$ in FIG. 1, includes a closed loop bus $B_1$, preferably formed from a single mode optical fiber, and an optical energy source $S_1$ that produces optical energy at a number of fixed channel frequencies and introduces the multi-channel energy onto the respective bus $B_1$ at power levels sufficient to meet the optical energy requirements of the local network $LN_1$, as explained more fully below. The optical energy source $S_1$ may take the form, for example, of a stabilized semiconductor or gas laser which provides a plurality of frequency stabilized outputs corresponding to pre-assigned frequency distinct channels in the optical portion of the electromagnetic spectrum, preferably in the 1.34 micron range.

The local network $LN_1$ includes a plurality of terminal devices $TD_{0[1]}$, $TD_{1[1]}$, $TD_{2[1]}$, $TD_{n[1]}$, with the bracketed subscript designating the local network to which the terminal device is assigned and the subscript adjacent the bracketed subscript indicating the respective terminal device assignment within the designated local network. The optical energy source $S_1$ provides each frequency distinct channel with a channel number "marker", such as a periodically transmitted binary word, for use by each terminal device TD in selecting channels. For example, where a system uses 256 frequency distinct channels, viz., channels 0-255, binary channel markers 00000000 through 11111111 are used to identify the various channels. As explained below, each terminal device $TD_n$ operates to remove a portion of the optical energy of a selected one of the network wide frequency distinct channel carriers provided by the network source $S_1$, modulate the removed carrier with information, and return a modulated sideband, either an upper sideband or a lower sideband, to the local network bus $B_1$ for either intranetwork transmission to another terminal device within the network $LN_1$ or internetwork transmission to another terminal device in the other local network $LN_2$. The coupling path $CP_{1-2}$ functions as a frequency selective bandpass filter for passing a subset of the channel frequencies for each local network.

Figure 2:
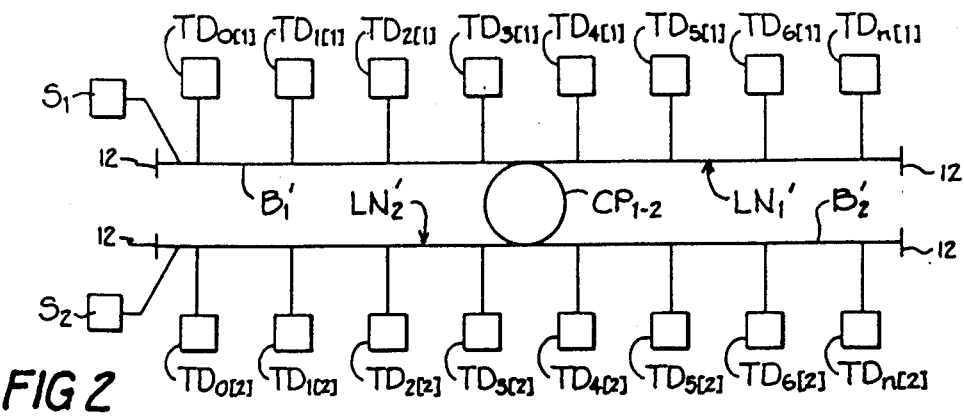
FIG. 2 is a schematic block diagram of a variation of the optical communication system of FIG. 1.

While the local networks $LN_1$ and $LN_2$ of FIG. 1 have been shown as closed loops, other bus arrangements are suitable, including, as shown in FIG. 2, local networks $LN_1'$ and $LN_2'$ defined by an open bus arrangement including linear buses $B_1'$ and $B_2'$ having reflectors 12 or functionally equivalent devices at the opposite ends of each bus to return light reflected from the bus. As in the case of the embodiment of FIG. 1, the linear networks $LN_1'$ and $LN_2'$ are coupled through a coupling path $CP_{1-2}'$ for providing a frequency selective path between one another for the internetwork channels.

Figure 3:
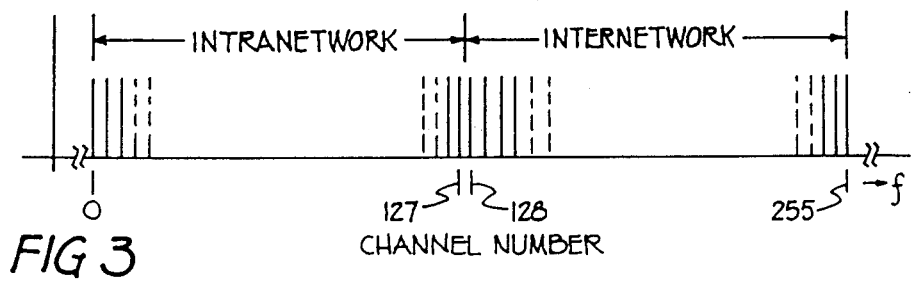
FIG. 3 is a graphical illustration of the channel number assignment for the intra and internetwork channels.
Figure 4:
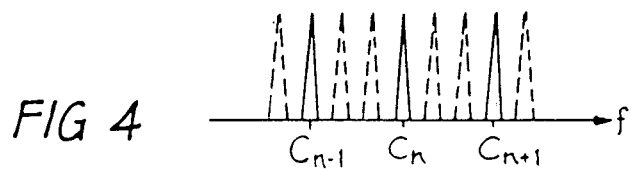
FIG. 4 is a graphical illustration of the relationship of three adjacent channels to their respective upper and lower sidebands.

Each of the terminal devices $TD_n$ within a local network $LN_n$ can tune to all system wide frequency distinct channels. For example, the overall communications system 10 can be assigned channels 0-255 for a total of 256 frequency distinct channels with all terminal devices within the local networks capable of acquiring each of these frequency distinct system wide channels. However, and as shown in FIG. 3, a first subset of the available frequencies, for example, channels 0-127, is designated for intranetwork communications and another subset, viz., channels 128-255 is designated for internetwork communications. To this end, the coupling path $CP_{1-2}$ functions to pass only the internetwork channel frequencies, that is, channels 128-255. The channel frequency assignments can be, for example, in 100 MHz segments centered about 1.34 microns, that is, channel 128 having an assigned frequency of $223,880 \times 10^3$ GHz. In general and as shown in FIG. 4, the interchannel frequency spacing should be wide enough to accommodate the adjacent modulated upper and lower sidebands of two adjacent channel carriers without interchannel crosstalk. As explained in more detail below, an originating terminal device $TD_o$ in the communications system 10 operates to transmit information signals by acquiring an available communications channel $C_m$, modulating the fixed frequency channel carrier provided by the network source $S_n$ to generate a modulated sideband, either an upper or lower sideband, and then transmitting the information carrying sideband to an addressed destination terminal device $TD_d$. A destination terminal device $TD_d$, when in a receive mode, monitors the information carrying sideband of the acquired channel $C_m$ to accept and demodulate the information bearing signal.

Figure 5:
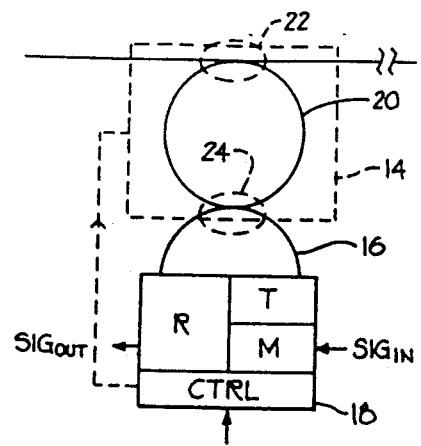
FIG. 5 is a schematic block diagram of a first terminal device usable with the communication systems of FIGS. 1 and 2.

Various terminal device $TD_n$ architectures are suitable for use with the communications system 10, as shown in FIGS. 5-8. In FIG. 5 an exemplary terminal device $TD_n$ includes a controllable resonant structure designated generally by the reference character 14, an optical coupling link 16, and a transceiver 18 which includes a receiver R, transmitter T, modulator M, and a controller CTRL. The receiver R is effective to demodulate an optical signal provided through the resonant structure 14 and provide the recovered information at $SIG_{out}$. The modulator M accepts an information signal at $SIG_{in}$ and modulates the acquired information channel carrier to present a modulated output through the resonant structure 14 to the local network bus $B_n$ for transmission to destination terminal device $TD_d$ on an intranetwork channel frequency or to a destination terminal device $TD_d$ in another local network $LN_n$ on an internetwork channel frequency. The controller CTRL operates to tune to a selected channel frequency in response to a user command $CTRL_{in}$ provided at an appropriate input or to a control signal presented through the local network bus $B_n$. The resonant structure 14 can include an optical fiber loop 20 coupled to the local network bus $B_n$ through a lateral coupling 22 and coupled to the optical coupling link 16 through another lateral coupling 24. The optical fiber loop 20 will preferentially support a large number of wavelengths or modes which are an integral number of wavelengths of the effective optical length of the loop 20. The number and spacing of the supported modes, and their respective frequencies, can be changed by changing the effective optical length of the optical fiber loop 20. The resonant characteristics of the optical fiber loop 20 can be controlled, for example, by controlling its operating temperature. In FIGS. 5-8, the dotted line extending between the controller CTRL and the respective resonant structure represents a control signal parameter, such as thermal energy, that is effective to change the resonant characteristics of the resonant structure to tune to any one of the available fixed frequency system wide channels.

Figure 6:
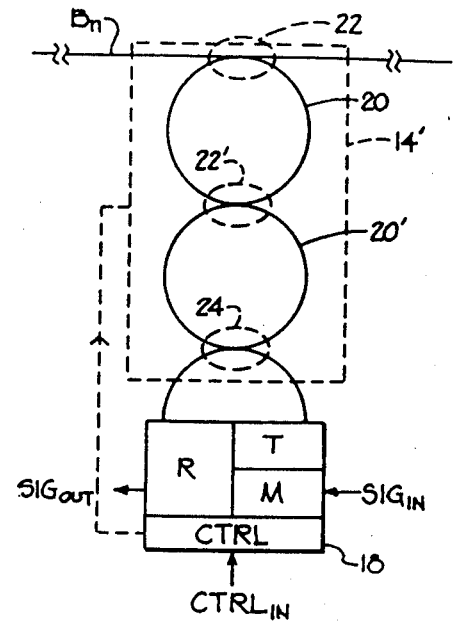
FIG. 6 is a schematic block diagram of another terminal device useful with the communication systems of FIGS. 1 and 2.

A variation of the terminal device of FIG. 5 is illustrated in FIG. 6 with like reference characters referring to like parts. In FIG. 6, the resonant structure 14' is defined by two optical fiber loops 20 and 20' with the loop 20 coupled to the local network bus $B_n$ through the lateral coupling 22, the loop 20' coupled to the optical coupling link 16 through the lateral coupling 24, and the optical fiber loops 20 and 20' coupled to one another through a lateral coupling 22'. Each optical fiber loop 20 and 20' supports a set of resonant modes with slightly different spacing so that modes at coincident frequencies will periodically occur to provide for increased selectivity in acquiring a fixed frequency communications channel. The optical fiber loops 20 and 20' are controlled in a manner similar to that described above for the embodiment of FIG. 5, for example, by controlling the operating temperature of both loops 20 and 20'.

While the resonant structures of FIGS. 5 and 6 have been described as optical fiber loops, other functionally equivalent structures are suitable. For example, an integrated optical loop structure can be formed by doping an appropriately sized light guiding core in a substrate, such as lithium niobate, using suitable dopants. The resonant characteristics of the integrated optical loop can be controlled in the manner described above.

Figure 7:
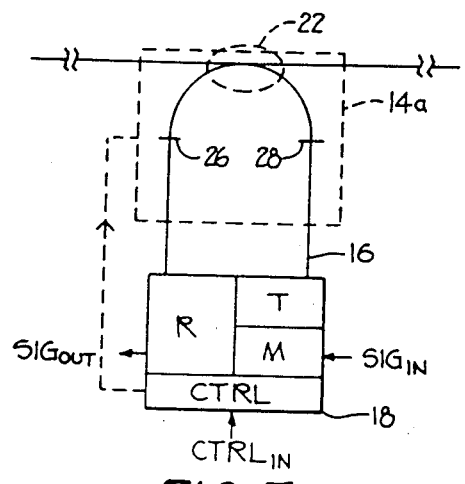
FIG. 7 is a schematic block diagram of a variation of the terminal device of FIG. 5.
Figure 8:
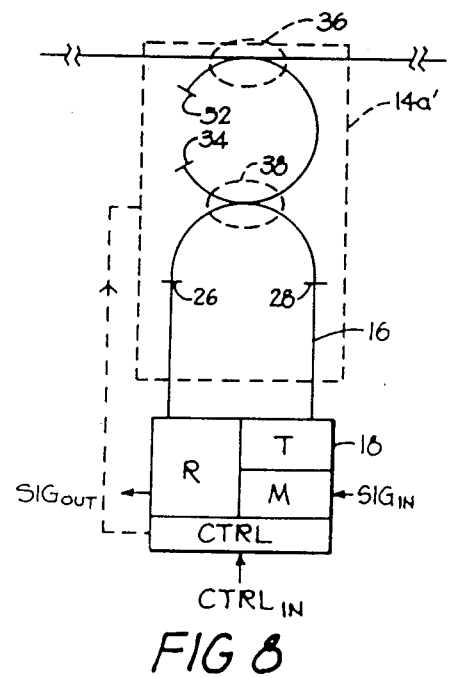
FIG. 8 is a schematic block diagram of a variation of the terminal device of FIG. 6.

Variations of the terminal devices $TD_n$ shown in FIGS. 5 and 6 are presented, respectively, in FIGS. 7 and 8. In FIG. 7 the optical coupling link 16 is laterally coupled to the local network bus $B_n$ through the lateral coupling 22. A portion of the optical coupling link 16 is provided with resonant characteristics by partially transmitting and partially reflective mirrors 26 and 28 or functionally equivalent devices that are inserted or otherwise interposed in the optical coupling link 16. The mirrors 26 and 28, along with the portion of the optical coupling link 16 extending between them, define a resonant structure 14a, functionally analogous to a Fabry Perot etalon, which will support a number of resonant modes that are an integral number of half wavelengths of the effective optical length between the mirrors 26 and 28. The resonant characteristics can be changed by changing the effective optical path length between the mirrors, for example, by changing the operating temperature of the resonant structure 14 as described above.

A double resonant structure variation of the terminal device $TD_n$ of FIG. 7 is illustrated in FIG. 8 and designated generally by the reference character 14a'. The double resonant structure 14a' includes an open resonant segment 30 bounded by mirrors 32 and 34 or other functionally equivalent devices. The resonant segment 30 is coupled to the local network bus $B_n$ through a lateral coupling 36 and to the optical coupling link 16 through a lateral coupling 38. The double resonant structure 14a' of FIG. 8 operates in a manner analogous to that of FIG. 6, that is, the resonant segment 30 and the resonant portion of the optical coupling link 16 between the mirrors 26 and 28 have respective resonant characteristics that support respective sets of resonant modes with selected of the modes coinciding in frequency to provide increased selectivity in tuning from one frequency specific channel to another. The resonant structure of FIG. 8 can be controlled to support a selected channel, for example, by controlling its operating temperature.

Figure 9:
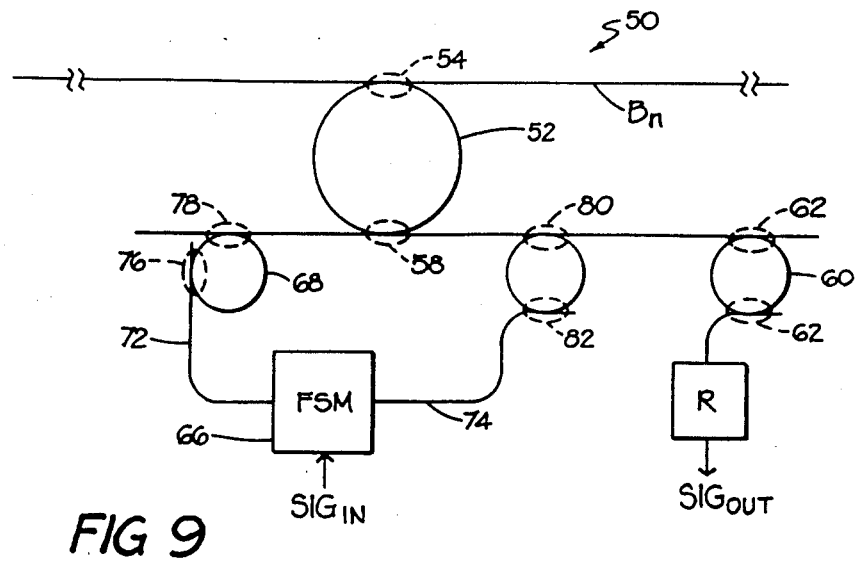
FIG. 9 is an optical circuit diagram of a terminal device utilizing a frequency shift modulator.
Figure 10:
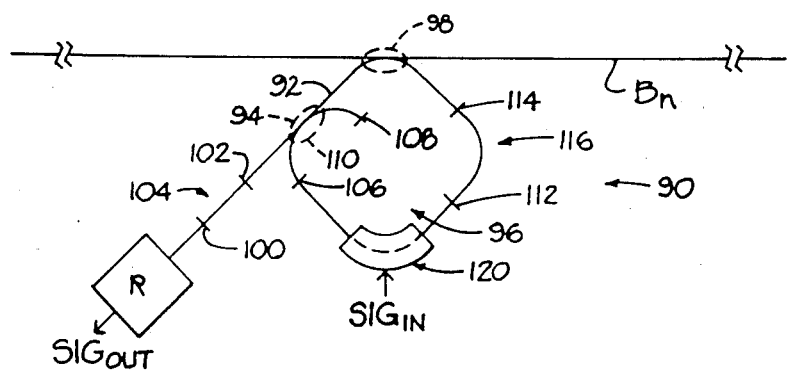
FIG. 10 is an optical circuit diagram of another terminal device utilizing a frequency shift modulator.

The various terminal device $TD_n$ architectures of FIGS. 5-8 can be implemented, for example, in accordance with the optical circuits of FIGS. 9 and 10. In FIG. 9, a transceiver circuit, designated generally by the reference character 50, includes a resonant structure in the form of an optical fiber loop 52 coupled to a local network bus $B_n$ through a lateral coupling 54 and to an optical coupling link 56 through another lateral coupling 58. The optical fiber loop 52 is controllable to tune to any one of the system channels with a bandwidth that is wide enough to accommodate the channel carrier and its upper and lower sidebands. The receiver R is coupled to the optical coupling link 56 through an optical circuit that includes a resonant loop 60 that is controlled to pass only that sideband, an upper or lower sideband depending upon the communications protocol, which contains the information carrying sideband. The resonant loop 60 is coupled to the optical coupling link 56 through a lateral coupling 62 and through another lateral coupling 62' to an optical coupling link 64 that is connected to the receiver R with the demodulated information content $SIG_{out}$ provided at an appropriate output. The transmitter circuitry includes a frequency shift modulator 66 coupled to the optical coupling link 56 through an optical circuit that includes resonant loops 68 and 70 and optical coupling links 72 and 74. The resonant loop 68 is coupled to the optical coupling links 56 and 72 through lateral couplings 78 and 76, respectively, and the resonant loop 70 is coupled to the optical coupling links 56 and 74 through lateral couplings 80 and 82, respectively. The resonant loop 68 is controlled and designed to pass optical energy at a frequency corresponding to the acquired channel carrier energy passed through the optical fiber loop 52 and to present the channel energy to the frequency shift modulator 66. An information signal $SIG_{in}$ is presented through the appropriate input to the frequency shift modulator 66 which provides information carrying upper and lower sidebands to the optical coupling link 74. The resonant loop 70 is designed to tune to and only pass optical energy at the frequency of the modulated sideband, either the upper or lower sideband depending upon the communications protocol, and pass the modulated sideband to the optical coupling link 56 for transfer through the lateral coupling 58, the optical fiber loop 52, and the lateral coupling 54 to the local network bus $B_n$.

A variation of the transceiver of FIG. 9 is shown in FIG. 10 and utilizes resonant optical fiber segments rather than resonant optical fiber loops. The transceiver, designated generally by the reference character 90, includes an optical fiber link 92 that is coupled at one end to the receiver R and onto itself at a lateral coupling 94 to form a closed circuit, designated generally at 96. The closed optical circuit 96 is coupled to the local network bus $B_n$ through a lateral coupling 98 and is controllable to tune to and select any one of the system wide channels. Partially transmitting and partially reflecting mirrors or functionally equivalent devices 100 and 102 are placed in the optical coupling link to define a resonant segment 104, mirrors 106 and 108 are placed in the optical coupling link 92 on opposite sides of the lateral coupling 94 to define a resonant segment 110, and mirrors 112 and 114 are placed in the optical coupling link 92 to define another resonant segment 116. A frequency shift modulator 120 is placed in the optical coupling link 92 between the resonant segments 110 and 116. The optical segment 104 is controllable to tune to the designated information carrying upper or lower sideband, depending upon the communications protocol, and pass the designated information carrying sideband to the receiver R which, in turn, provides a SIG$_{out}$ output. The resonant segment 110 is designed to pass the acquired channel carrier frequency from the lateral coupling 98 to the frequency shift modulator 120 which, with a SIG$_{in}$ input, generates modulated upper and lower sidebands. The resonant segment 116 passes only the designated upper or lower sideband, depending upon the communications protocol, through the lateral coupling 98 to the local network bus $B_n$ for transmission on an intranetwork channel to a destination terminal device TD$_d$ within the same local network or on an internetwork channel to a destination terminal device TD$_d$ within another local network.

The communications system 10 operates to effect communications between an originating terminal device TD$_o$ and a destination terminal device TD$_d$ by assigning, as explained above in relationship to FIG. 3, a subset of the set of fixed frequency channel carriers for intranetwork communications and another subset for internetwork communications with a coupling path provided between the local networks to pass only the internetwork channels. In the preferred embodiment of the present invention and as explained in greater detail below, one channel in the intranetwork subset and one channel in the internetwork subset are designated as "manager" channels and are used to effect addressing and handshaking between originating and destination terminal devices. Where the communications is intranetwork, the manager channel for intranetwork communications is used, and where the communications are internetwork, the manager channel for internetwork communications is used. For example, in the channel assignment presented in FIG. 3 channel 0 is designated as the intranetwork manager channel, and channel 128 is designated as the internetwork manager channel. In order for an originating terminal device TD$_n$ to establish communications with a destination terminal device TD$_n$, as explained more fully below in relationship to FIGS. 11a, 11b, and 11c, the originating terminal device TD$_o$ tunes sequentially from one channel to the other in the appropriate subset for either intra or internetwork communications and listens for modulation of the adjacent sidebands until a non-used channel is located. The originating terminal device TD$_o$ then generates a "channel demand" signal which is effective to prevent all other terminal devices from also attempting to acquire the channel. Once a channel is acquired by the originating terminal device TD$_o$, the originating terminal device TD$_o$ then transmits the address of the desired destination terminal device TD$_d$ and the identity of the acquired communications channel on the appropriate manager channel, i.e., channel 0 in the case of intranetwork communications and channel 128 in the case of internetwork communications. All terminal devices TD$_d$ that are not in a communications mode default to an answer ready mode, as explained in more detail below with regard to FIG. 12, in which the manager channels for intra and internetwork communications are monitored. When a terminal device TD$_n$ in the answer ready mode recognizes its own address, it responds by tuning to the acquired communications channel as identified by the originating terminal device TD$_o$.

Figure 11A:
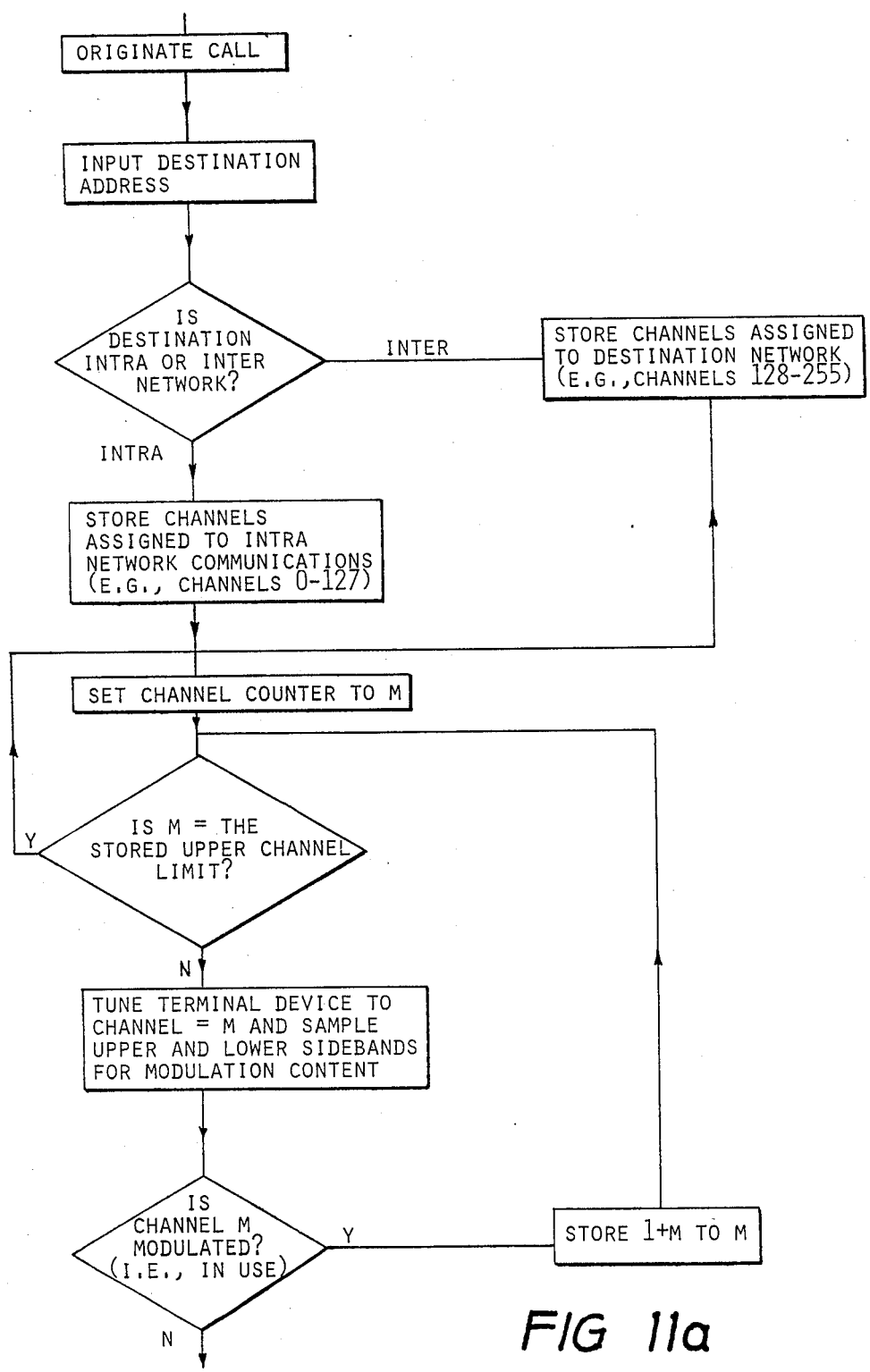
FIGS. 11a, 11b, and 11c represent a flow diagram illustrating a network access protocol for an originating terminal device.
Figure 11B:
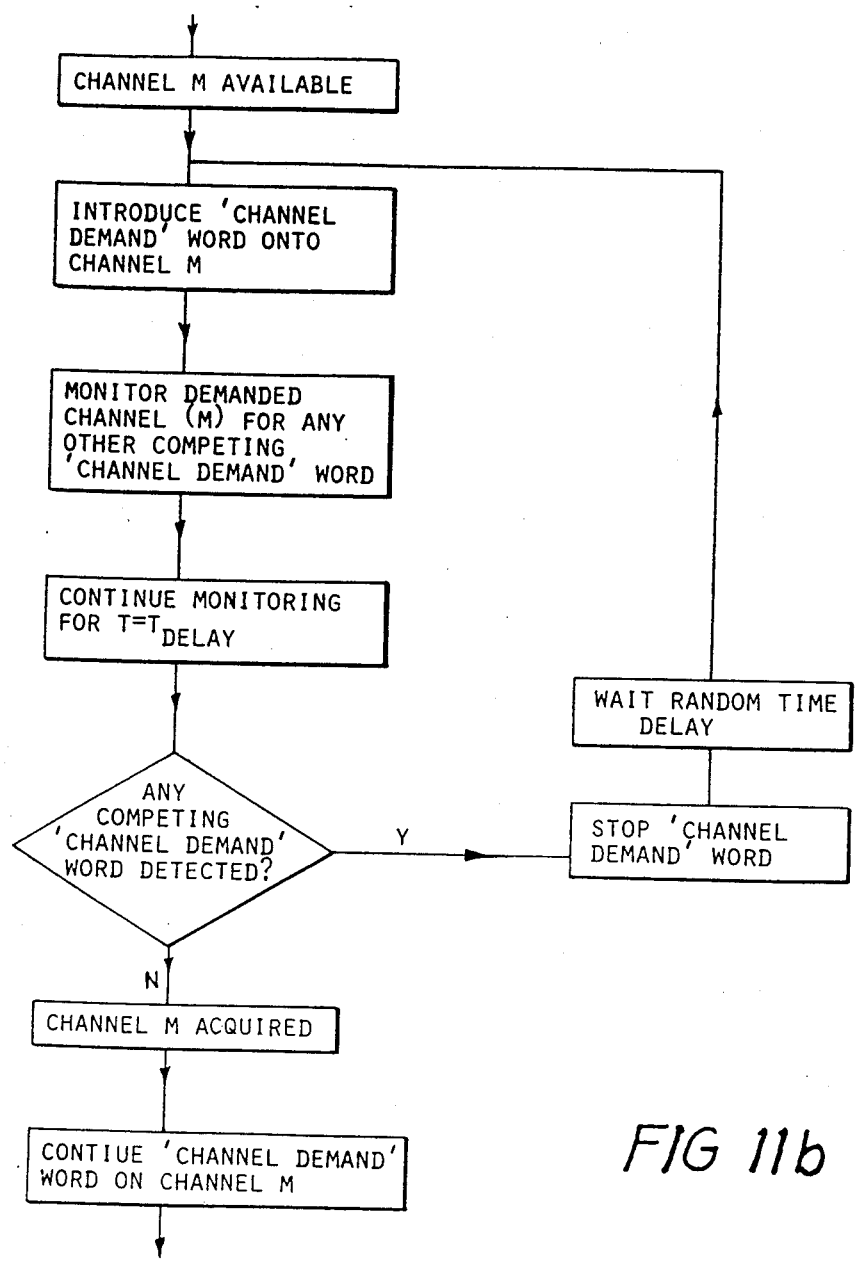
Figure 11C:
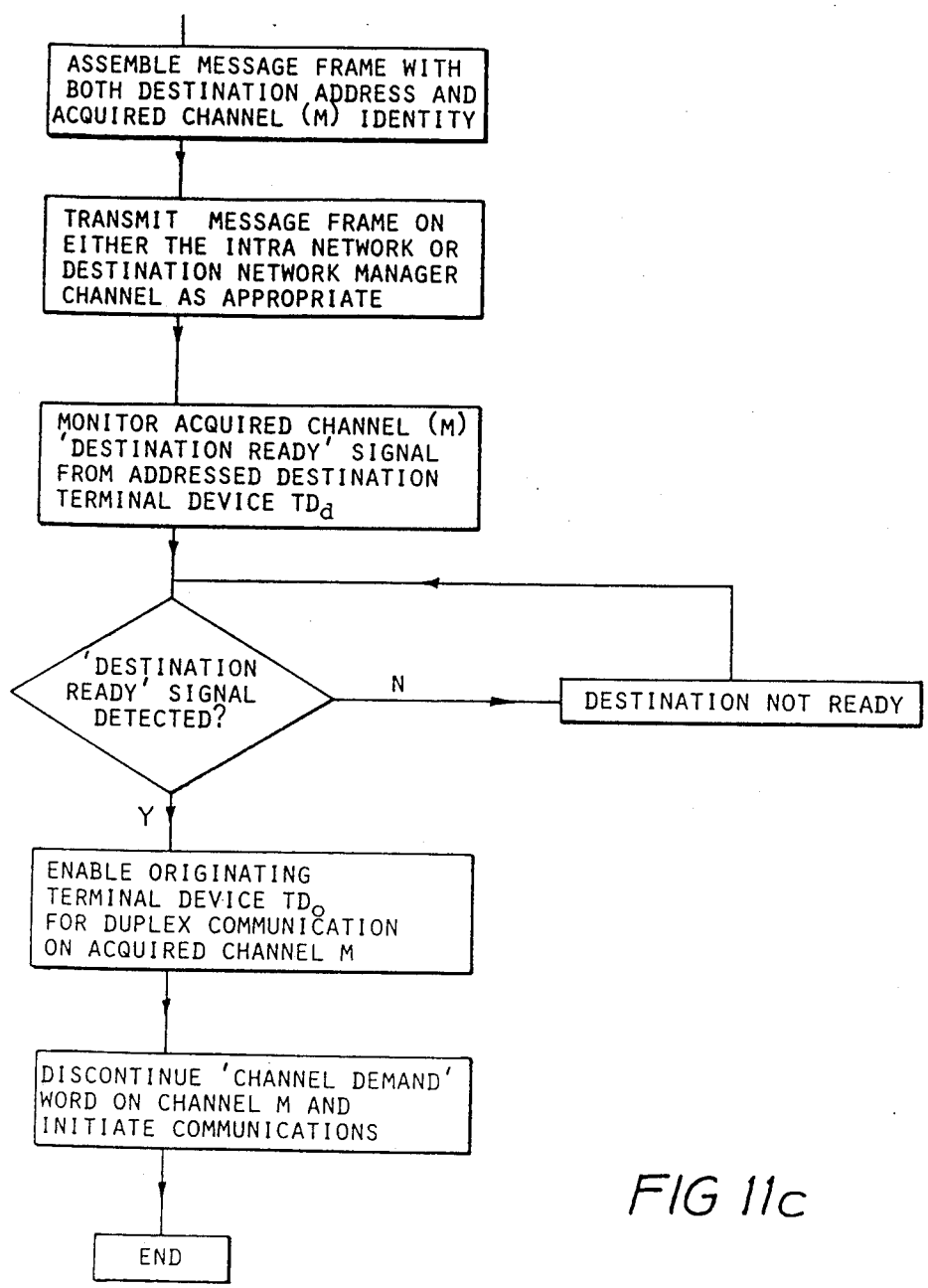

The terminal device TD$_n$ utilizes the network access protocol illustrated in FIGS. 11a, 11b, and 11c for establishing a communications pathway between an originating terminal device TD$_o$ and a destination terminal device TD$_d$. As shown in FIG. 11a, the access protocol is initiated by inputting the address of the destination terminal device TD$_d$. A query is then performed to determine if the destination address is for a terminal device TD$_d$ within the local network, that is, intranetwork, or outside the local network, i.e., internetwork. If the destination address is intranetwork, the channel assignment for intranetwork communications, e.g., channels 1–127 in the context of the example of FIG. 3, are stored, and, if the destination address is internetwork, the channel assignment for internetwork communications, e.g., channels 129–255, are stored. The intranetwork and internetwork manager channels, channels 0 and 128, are not stored as communications channels. Once the destination channel assignments are stored, a channel counter M is set to the initial communication channel, 1 in the case of the intranetwork channel subset and 129 in the case of the internetwork channel subset, and a query is presented to determine if M is less than the final or last channel in the destination channel assignment. If the channel counter M is equal to the last channel, the channel counter M is reset, and, if the channel counter M is less than the stored upper limit, the originating terminal device TD$_o$ tunes to channel M and samples the adjacent upper and lower sidebands for modulation content. If modulation content is detected, which indicates channel M is in use, the channel counter M is incremented to M+1 and the next channel, M+1, is examined. If no modulation content is detected for the upper and lower sidebands of channel M, indicating that channel M is available, the originating terminal device TD$_o$ introduces a "channel demand" word onto channel M to establish priority for use relative to any other terminal device TD$_n$. Additionally, the originating terminal device TD$_o$ monitors channel M for the "channel demand" word of any other terminal device TD$_n$ competing for channel M with the monitoring step continued for a selected time period. If a competing "channel demand" word is detected, the originating terminal device TD$_o$, as well as the competing terminal device TD$_n$, discontinue their respective "channel demand" words, wait a randomly determined time period, and resume their "channel demand" word with one of the terminal devices then acquiring channel M. Once channel M has been acquired, the "channel demand" word is maintained while the originating terminal device TD$_o$ assembles a message frame containing both the address of the destination terminal device $TD_d$ and the identity of acquired channel M. The message frame is transmitted on the appropriate manager channel, i.e., channel 0 in the case of intranetwork communications and channel 127 in the case of internetwork communications. Additionally, the acquired channel M is monitored by the originating terminal device $TD_o$ for a "destination ready" signal from the addressed destination terminal device $TD_d$. When the "destination ready" signal is detected, the originating terminal device $TD_o$ is enabled for duplex communications, that is, transmission on a predetermined upper or lower sideband of channel M and reception on the other of the sidebands, depending upon the communications protocol, and the "channel demand" word is discontinued.

Figure 12:
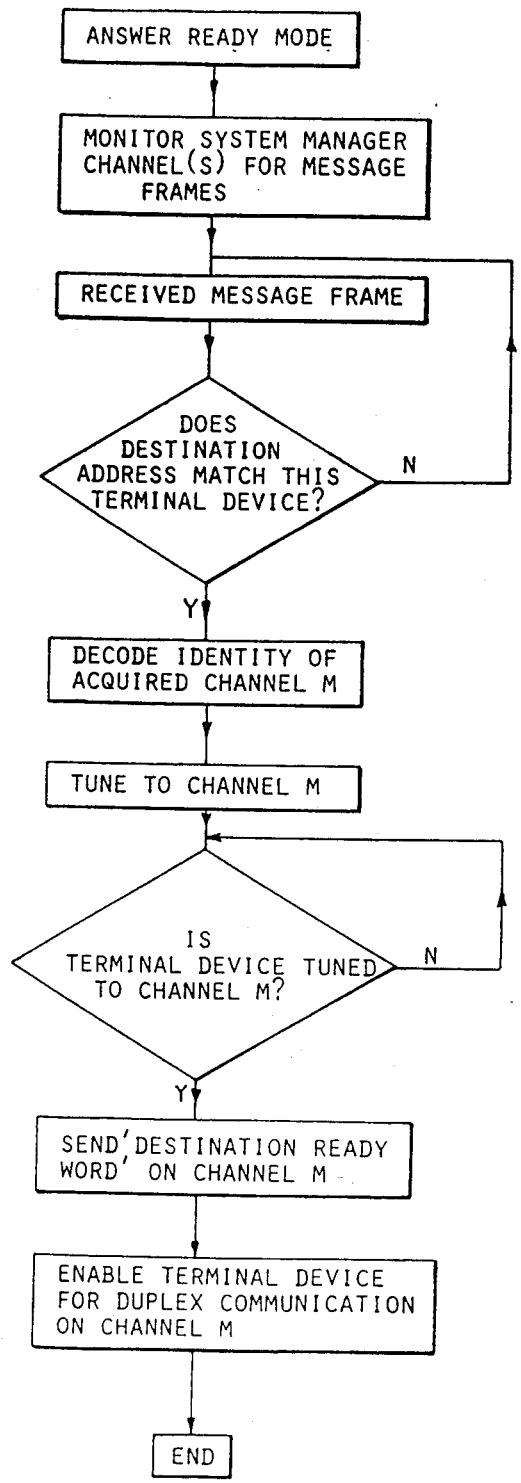
FIG. 12 is a flow diagram illustrating the control sequence of a terminal device in a standby data-ready or answer mode.

The answer ready sequence for a destination terminal device $TD_n$ is illustrated in FIG. 12 and, as shown therein, all terminal devices $TD_n$ that are not in active communications, monitor the manager channels, channel 0 for intranetwork communications and channel 128 for internetwork communications, for message frames transmitted by an originating terminal device $TD_o$. When a message frame is received, the received address word is compared with the address of the monitoring terminal device $TD_n$ until a match is detected. Thereafter, the identity of the channel acquired by the originating device, channel M, is decoded. The addressed destination terminal device $TD_d$ then tunes to channel M and sends a "destination ready" message to the originating terminal device $TD_o$ with both terminal devices $TD_o$ and $TD_d$ then enabled for duplex communications.

Figure 13:
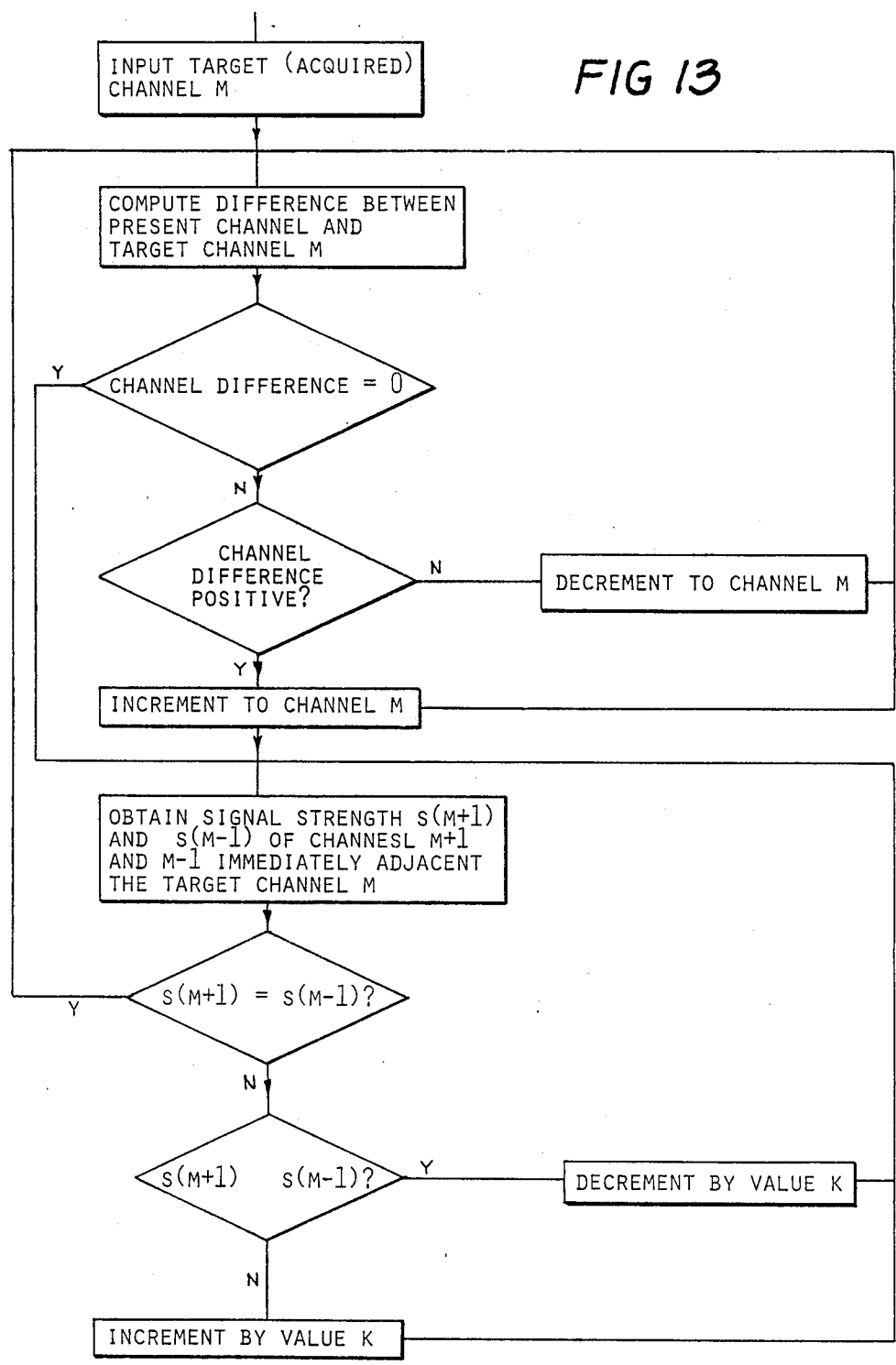
FIG. 13 is a flow diagram illustrating the control sequence for tuning from one communication channel to another and for maintaining an acquired channel.

The terminal devices $TD_n$ can be tuned from one communications channel to another and maintained on channel in accordance with the flow diagram of FIG. 13. As shown therein, the identity of the acquired or target channel M is decoded from the received message frame or from a user input $CTRL_{in}$ and the difference between the target channel and the present channel is computed. Thereafter a query is presented to determine if the channel difference is zero, and, if zero, the sequence branches to an auto channel control sequence described below. If the channel difference is not zero, another query is presented to determine if the channel difference is positive or negative. If the channel difference is negative, the terminal device decrements by the computed difference, and, if the channel difference is positive, the terminal device increments by the computed difference. In either case, the sequence recurs until the channel difference is zero.

Figure 14:
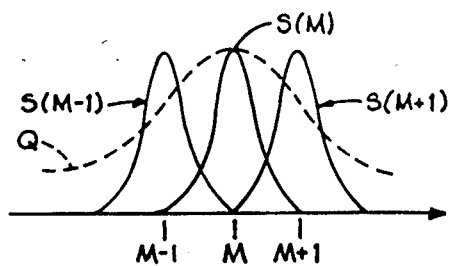
FIG. 14 is a graphical illustration of three adjacent carriers and the manner by which a tuneable device is maintained by a channel using the signal strengths of the immediately adjacent channels.

After the channel tuner has nominally acquired the desired channel, on-channel control is accomplished using the relative carrier strengths of the two channels immediately above and below the desired channel. As shown in FIG. 14, the desired channel M, which is nominally acquired by the sequence of FIG. 13, is bracketed by immediately adjacent channels $M+1$ and $M-1$ with each channel having a measurable carrier strength $S(M+1)$, $S(M)$, and $S(M-1)$. The terminal device $TD_n$ is provided with a symmetrical selectivity curve, Q, that peaks at one channel and has a width sufficient to pass a portion of the carrier energy of the immediately adjacent channels $M+1$ and $M-1$. The slope of the curve Q is chosen so that the carrier strength $S(M+1)$ and $S(M-1)$ of the immediately adjacent channels is 15 to 20 dB down from that of the desired channel M. The terminal device $TD_n$ can be maintained on the acquired channel M by utilizing the perceived carrier strength of the immediately adjacent channels $M+1$ and $M-1$ as illustrated in the lower half of FIG. 13. As shown therein, the signal strength S of the channels $M+1$ and $M-1$ immediately adjacent the target channel M are determined. A query is then presented to determine if the two signal strengths $S(M+1)$ and $S(M-1)$ are equal, and, if so, the control sequence loops about this query. Where the two signal strengths are equal, the terminal device $TD_n$ is optimally tuned to the target channel M. Where the signal strengths are not equal, which indicates that the terminal device $TD_n$ is off-channel, a query is presented to determine if the signal strength of the upper channel, $S(M+1)$, is greater than that of the lower channel, $S(M-1)$, and, if so, the terminal device $TD_n$ is decremented by a constant value K toward the target channel M. In the alternative, the terminal device $TD_n$ is incremented by the value of constant K toward the target channel M. In each case, the value of K is a sub-interval of the channel-to-channel separation so that the terminal device $TD_n$ will tune toward the target channel in sub-channel steps.

Figure 15:
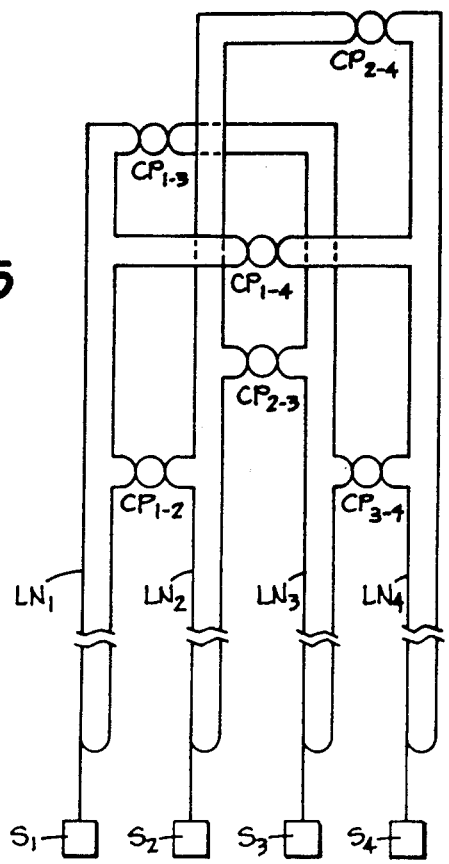
FIG. 15 is a schematic block diagram of another optical communications system in accordance with the present invention utilizing four interconnected local networks.
Figure 16:
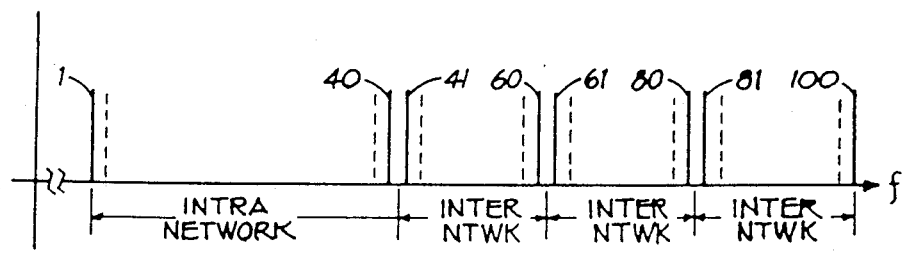
FIG. 16 is a graphical illustration of the frequency assignments of the intra and internetwork channels for the system of FIG. 15.

In the embodiments described above in relationship to FIGS. 1 and 2, two local networks $LN_1$ and $LN_2$ are coupled through a single coupling path $CP_{1-2}$. As can be appreciated, the communication system of the present invention is not limited to two local networks LN and a much larger number of local networks can be interconnected with each network using the commonly assigned intranetwork channels and respective unique subsets of the internetwork channels for communications with other local networks. For example, and as illustrated in FIG. 15, four local networks $LN_1$, $LN_2$, $LN_3$, and $LN_4$ can be interconnected with one another through various coupling paths CP with local network $LN_1$ connected to local networks $LN_2$, $LN_3$, and $LN_4$ through, respectively, coupling paths $CP_{1-2}$, $CP_{1-4}$, and $CP_{1-3}$; local network $LN_2$ connected to local networks $LN_1$, $LN_3$, and $LN_4$ through, respectively, coupling paths $CP_{1-2}$, $CP_{2-3}$ and $CP_{2-4}$; and local network $LN_3$ connected to local networks $LN_1$, $LN_2$, and $LN_4$ through coupling paths $CP_{1-3}$, $CP_{2-3}$, and $CP_{3-4}$. As shown in FIG. 16, 100 channels, channels 1 to 100 are provided for both intra and internetwork communications. More specifically and as shown in FIG. 16, channels 1 to 40 are dedicated to intranetwork communications within each local network $LN_1$, $LN_2$, $LN_3$, and $LN_4$ with channels 41 to 60, 61 to 80, and channels 81 to 100 dedicated to internetwork communications between local networks as summarized in the following table:

TABLE I

|  | $LN_1$ | $LN_2$ | $LN_3$ | $LN_4$ |
|---|---|---|---|---|
| $LN_1$ | 1–40 | 41–60 | 61–80 | 81–100 |
| $LN_2$ | 41–60 | 1–40 | 81–100 | 61–80 |
| $LN_3$ | 61–80 | 81–100 | 1–40 | 41–60 |
| $LN_4$ | 81–100 | 61–80 | 41–60 | 1–40 |

One channel of each subset, for example, channels 1, 41, 61, and 81 are designated as respective manager channels which function in the manner described above.

The various coupling paths CP can be formed as resonant structures, including multiple optical fiber loops, having optical passband characteristics corresponding to the frequency range associated with each arbitrarily assigned set of internetwork channels, that is, a coupling path defined by an optical bandpass filter F1 for channels 41–60, an optical bandpass filter F2 for channels 61–80, and, lastly, an optical bandpass filter F3 for channels 81-100. The following table, Table II, indicated the bandpass filter assignments for the system of FIG. 15 for the channel assignments of Table I.

TABLE II

|     | $LN_1$ | $LN_2$ | $LN_3$ | $LN_4$ |
| --- | --- | --- | --- | --- |
| $LN_1$ | n/a | F1 | F2 | F3 |
| $LN_2$ | F1 | n/a | F3 | F2 |
| $LN_3$ | F2 | F3 | n/a | F1 |
| $LN_4$ | F3 | F2 | F1 | n/a |

The system of the present invention allows for the beneficial reuse of the intranetwork channels since identical channels, viz., channels 1-40 in the case of the present example, are available for additional reuse with each additional local network added to the system. The need for switching nodes and associated control is eliminated since all terminal devices in the system have access to every other terminal device through use of the appropriate designated channels. Since the optical spectrum is large, e.g., on the order of $30 \times 10^3$ GHz, a large number of terminal devices and networks can be accommodated.

Thus, it will be appreciated from the above that as a result of the present invention, a highly effective optical communications system is provided by which the principal objective, among others, is completely fulfilled. It will be equally apparent and is contemplated that modifications and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An optical communications system, comprising:
a first and at least one other optical communications network, each network having a respective communications bus, an optical energy source for introducing a plurality of frequency distinct optical carriers into the respective communications bus, each carrier defining a communications frequency, and a plurality of terminal devices connected to their respective communications bus for communications therethrough;
said terminal devices of said first and said other optical communications network comprising means for selecting one of the plurality of communications frequencies for effecting communications with one another including a subset of communications frequencies for intranetwork communications and a subset of communications frequencies for internetwork communications; and
means for coupling said first and said other optical communications network with one another, said coupling means passing said subset of communications frequencies for internetwork communications.

2. The optical communications system of claim 1, wherein said plurality of optical carriers includes said subset for intranetwork communications and said subset for internetwork communications.

3. The optical communications system of claim 2, further comprising:
means for marking each of said frequency distinct optical carriers with a unique channel identifier.

4. The optical communications system of claim 1, further comprising:
means for marking each of said frequency distinct optical carriers with a unique channel identifier.

5. The optical communications system of claim 1, wherein each said optical communications network is defined as a closed optical loop.

6. The optical communications system of claim 1, wherein each said optical communications network is defined as an open optical bus having ends thereof.

7. The optical communications system of claim 6, wherein each said open optical bus includes optical signal return means associated with the ends thereof.

8. The optical communications system of claim 1, wherein said coupling means comprises a bandpass filter for passing frequencies corresponding to said subset of communications frequencies for internetwork communications.

9. The optical communications system of claim 1, wherein each of said terminal devices comprise:
means defining a controllable resonant structure for tuning to a selected one of the plurality of internetwork and intranetwork communications frequencies.

10. The optical communications system of claim 9, further comprising:
means for propagating an information bearing signal through said resonant structure means for transmission to another terminal device.

11. The optical communications system of claim 10, further comprising:
means for receiving an information bearing signal through said resonant structure means propagated from another terminal device and for providing a recovered information signal therefrom.

12. The optical communications system of claim 9, further comprising:
means for propagating an information bearing signal through said resonant structure means for transmission to another terminal device; and
means for receiving an information bearing signal through said resonant structure means propagated from another terminal device and for providing a recovered information signal therefrom.

13. The optical communications system of claim 12, further comprising:
means for controlling said resonant structure means for selecting one of said plurality of communications frequencies.

14. The optical communications system of claim 12, wherein said means for propagating comprises:
means defining a frequency shift modulator for accepting an information signal and an optical carrier and providing a modulated information bearing signal therefrom.

15. The optical communications system of claim 9, wherein said controllable resonant structure comprises:
a closed optical loop coupled to said communication bus and having resonant characteristics that vary as a function of at least one control parameter.

16. The optical communications system of claim 15, further comprising:
at least one other closed optical loop coupled to said first mentioned optical loop and having resonant characteristics that vary as a function of at least one control parameter.

17. The optical communications system of claim 9, wherein said controllable resonant structure comprises:

an open optical segment coupled to said communication bus and having resonant characteristics that vary as a function of at least one control parameter.

18. The optical communications system of claim 17, further comprising:
at least one other open optical segment coupled to said first mentioned optical segment and having resonant characteristics that vary as a function of at least one control parameter.

19. The optical communications system of claim 9, wherein said terminal devices comprise:
a closed optical loop coupled to said communications bus and having resonant characteristics that vary as a function of at least one control parameter; and
means defining a frequency shift modulator having an input port and an output port, said input port coupled to said closed optical loop through an input optical loop and said output port coupled to said closed optical loop through an output optical loop.

20. The optical communications system of claim 9, wherein said terminal devices comprise:
an optical circuit coupled to said communications bus and having first and second segments thereof having resonant characteristics that vary as a function of at least one control parameter; and
means defining a frequency shift modulator having an input port and an output port, said input port coupled to said communications bus through said first segment and said output port coupled to said communications bus through said second segment.

21. The optical communications system of claim 9, wherein said resonant structure means has a frequency response passband characteristic sufficient to sense carrier energy of a selected carrier and adjacent upper and lower frequency carriers.

22. An optical communications system, comprising:
a first and at least one other optical communications network, each network having a respective communications bus and a plurality of terminal devices connected to their respective communications bus for communications therethrough;
said terminal devices of said first and said other optical communications network comprising means for selecting one of a plurality of communications frequencies for effecting communications with one another including a subset of communications frequencies of intranetwork communications and a subset of communications frequencies for internetwork communications;
means for coupling said first and said other optical communications network with one another, said coupling means passing said subset of communications frequencies for internetwork communications;
wherein each of said terminal devices comprise means defining a controllable resonant structure for tuning to a selected one of the plurality of internetwork and intranetwork communications frequencies;
wherein said resonant structure means has a frequency response passband characteristic sufficient to sense carrier energy of a selected carrier and adjacent upper and lower frequency carriers; and
wherein the frequency response characteristic of said resonant structure means is such that the carrier energy passed for the adjacent upper and lower frequency carriers is less than that of the selected carrier.

23. The optical communications system of claim 22, wherein said terminal device senses the energy level of the adjacent upper and lower frequency carriers and controls said resonant structure means to maintain both energy levels substantially equal.

24. A method for controlling a tunable element in an optical communications system of the type having a plurality of frequency distinct carriers, said method comprising the steps of:
sensing the carrier strength of carriers immediately adjacent a selected carrier; and
controlling a tunable resonant structure until the sensed carrier strength of the carriers immediately adjacent to the selected carrier are equal to one another.

* * * * *